US009004543B2

(12) United States Patent
Bongiorni et al.

(10) Patent No.: US 9,004,543 B2
(45) Date of Patent: Apr. 14, 2015

(54) LOCKING MEMBER FOR A CONNECTION DEVICE FOR FLUID TRANSFER, THIS DEVICE AND THE LOCKING METHOD THEREFOR

(71) Applicant: Hutchinson, Paris (FR)

(72) Inventors: Jean-Baptiste Bongiorni, Montargis (FR); Denis Godeau, Vieilles Maisons (FR)

(73) Assignee: Hutchinson, Paris (FR)

( * ) Notice: Subject to any disclaimer, the term of this patent is extended or adjusted under 35 U.S.C. 154(b) by 129 days.

(21) Appl. No.: 13/691,110

(22) Filed: Nov. 30, 2012

(65) Prior Publication Data

US 2013/0140808 A1    Jun. 6, 2013

(30) Foreign Application Priority Data

Dec. 6, 2011    (FR) ...................... 11 61215

(51) Int. Cl.

| | |
|---|---|
| *F16L 37/00* | (2006.01) |
| *F16L 21/08* | (2006.01) |
| *F16L 37/088* | (2006.01) |
| *F16L 37/12* | (2006.01) |
| *F02M 35/10* | (2006.01) |

(52) U.S. Cl.
CPC ............... *F16L 21/08* (2013.01); *F16L 37/088* (2013.01); *F16L 37/12* (2013.01); *F02M 35/10144* (2013.01)

(58) Field of Classification Search
CPC ... F16L 37/0841; F16L 37/086; F16L 37/088; F16L 37/0982; F16L 37/0985
USPC .................................................. 285/81, 305
See application file for complete search history.

(56) References Cited

U.S. PATENT DOCUMENTS

| | | | | |
|---|---|---|---|---|
| 3,314,696 A | * | 4/1967 | Ferguson et al. .............. | 285/305 |
| 3,450,424 A | * | 6/1969 | Calisher ........................ | 285/305 |
| 3,628,768 A | * | 12/1971 | Hutt .............................. | 285/305 |
| 5,423,577 A | * | 6/1995 | Ketcham ....................... | 285/305 |

(Continued)

FOREIGN PATENT DOCUMENTS

| | | |
|---|---|---|
| EP | 2251581 | 11/2010 |
| FR | 2855590 | 12/2004 |

(Continued)

OTHER PUBLICATIONS

Search Report for French Application No. 1161215; dated Aug. 16, 2012.

*Primary Examiner* — David E Bochna
(74) *Attorney, Agent, or Firm* — Alston & Bird LLP

(57) ABSTRACT

Locking member having a male end-piece having a collar, a female end-piece having a ring which receives the male end-piece, and two flaps configured to be pushed in through two apertures of the ring and which are blocked behind the collar following insertion of the male end-piece, each flap having an inner and outer faces connected to each other by front and rear faces, relative to the insertion of the male end-piece. Each flap has inclined portions formed on the front face and set back from a foremost portion of this front face and including a guiding portion connecting the foremost portion to the inner face and cooperating with the end of the male end-piece to guide insertion thereof, and a blocking portion connecting the foremost portion to the front face and blocking the flaps against front edges of the apertures to act counter to opening of the member.

10 Claims, 5 Drawing Sheets

(56) References Cited

U.S. PATENT DOCUMENTS

| | | | |
|---|---|---|---|
| 5,452,924 A * | 9/1995 | Kujawski | 285/305 |
| 6,179,345 B1 * | 1/2001 | Gensert et al. | 285/305 |
| 6,554,322 B2 * | 4/2003 | Duong et al. | 285/305 |
| 6,681,458 B2 * | 1/2004 | Seymour | 285/305 |
| 6,997,486 B2 * | 2/2006 | Milhas | 285/305 |
| 7,438,328 B2 * | 10/2008 | Mori et al. | 285/305 |
| 7,530,605 B2 | 5/2009 | Rigollet et al. | |
| 7,631,904 B2 * | 12/2009 | Heim et al. | 285/305 |
| 2004/0183301 A1 * | 9/2004 | Yoshida | 285/305 |
| 2008/0279621 A1 | 11/2008 | Chaupin | |
| 2010/0276924 A1 | 11/2010 | Gillet et al. | |

FOREIGN PATENT DOCUMENTS

| | | |
|---|---|---|
| FR | 2883607 | 9/2006 |
| FR | 2891889 | 4/2007 |
| WO | WO-2006/099933 | 9/2006 |

\* cited by examiner

LOCKING MEMBER FOR A CONNECTION DEVICE FOR FLUID TRANSFER, THIS DEVICE AND THE LOCKING METHOD THEREFOR

FIELD

The present invention relates to a locking member which is intended to be provided on a snap-fitting connection device for fluid transfer, to such a connection device comprising this locking member and to the locking method therefor. The invention can be applied to rapid connections for transferring all types of pressurized fluid, and in particular to an air intake circuit of a motor vehicle, such as a return circuit returning a supercharged combustion engine cooling pipe to a butterfly valve casing.

BACKGROUND

Generally, in a fluid transfer circuit for a motor vehicle, in order to connect a flexible or rigid hose that has a male end-piece that is lockable via a collar which it has, it is known to use a connection device which incorporates a female end-piece which is provided by welding or clip-fitting with a female connector which receives this male end-piece, an annular seal which is pressed against the male end-piece after the latter has been fitted in the female connector, and a locking pin which is inserted through this female connector in order to block the end-piece therein in a pushed-in and locked position. Mention may, for example, be made of document FR-B1-2 891 889 for the description of such a lockable connection device and the documents FR-B1-2 855 590 and WO-A1-2006/099933 which describe various metal locking pins which can be used in such a device.

A major disadvantage of these known connection devices is that they do not have sufficient mechanical grip with respect to end-pieces which have a collar of low radial height, which may result in the disconnection of the device by the pin becoming disengaged with respect to the male end-piece.

Another disadvantage of these existing devices having a metal pin is that they do not facilitate the fitting of the pin in contact with the male end-piece.

SUMMARY

An object of the present invention is to provide a locking member which is intended to be provided on a snap-fitting connection device for fluid transfer comprising a male tubular end-piece having a collar and having a convergent and rounded connection end, and a female tubular end-piece which is surrounded and extended axially by a female connection ring and which receives the male end-piece in a sealed manner, this member overcoming these disadvantages in particular and comprising two resilient locking flaps which are joined together by a gripping head and which are capable of being pushed in transversely and in a reversible manner through two respective symmetrical apertures of the ring, then of being blocked by means of snap-fitting against and behind the collar following the complete insertion of the male end-piece into the female end-piece, each flap having a cross section which varies over the length thereof and two faces, an inner face and an outer face, which are connected to each other by two faces, a front face and a rear face, relative to the direction of insertion of the male end-piece.

To this end, a member according to the invention is such that each flap locally comprises inclined portions which are formed on the front face so as to be set back from a foremost portion of this front face and which comprise:

at least one inclined guiding portion which connects this foremost portion to the inner face and which is capable of co-operating with said end of the male end-piece which spreads the flaps from each other in order to guide the insertion of this end-piece until the collar thereof extends axially beyond these flaps, and at least one inclined blocking portion which connects this foremost portion to the remainder of the front face by extending away from the inner face, and which is capable of co-operating with the ring by blocking the flaps in a closed position axially against front edges of the apertures in order to oppose the opening of the member during operation.

In the present description, the terms "behind" or "rear" refer to relative positions in the direction of the axis of symmetry of the male and female end-pieces and of the ring that are directed axially counter to the direction of insertion of the connection end of the male end-piece, and the terms "in front of", "front" or "foremost" refer to relative positions in the direction of this axis that are directed axially towards the direction of insertion of this end of the male end-piece.

According to another feature of the invention, said at least one inclined guiding portion and said at least one inclined blocking portion may each be defined, over the same cross section of each flap, by a chamfer which forms an angle of from 30 to 60° with said foremost portion of said front face and/or with said inner face.

It should be noted that the inclined guiding portion(s) thus provide(s) assistance with fitting the device, which facilitates the insertion of the male end-piece in contact with the inclined portion(s) for guiding the pin, forming the same number of chamfers that act on the male end-piece, and that the inclined blocking portion(s) allow(s) the pin to be blocked securely against the male end-piece, thereby ensuring the device remains locked during operation.

Advantageously, this locking member may have a composite structure which comprises:

a metal locking pin which comprises an upper portion which forms said gripping head and two substantially curved branches which have two free ends, respectively, which are, for example, bent over on the same axial side of the remainder of the pin in order to promote their guiding in the connection ring, and two plastics locking sheaths which are fixedly joined to these branches, respectively, with the exception of their free ends and which each alone define said inner face, said outer face and said front face of each flap, including said inclined portions.

It should be noted that, in a variant, the free ends of the pin could be located in the plane of these branches, and may be curved or non-curved (that is, for example, may have straight ends in the extension of the branches).

According to another preferred feature of the invention, each locking sheath, over said cross section of each flap, may substantially have a "U"-like shape which partially tightly surrounds each branch of the pin, which pin may have a rounded or polygonal cross section, each sheath preferably being mounted on the pin by means of clip-fitting or, in a variant, being fixedly joined to the pin by means of over-molding (that is, by injection-molding a plastics material which constitutes this sheath over the branches of the pin arranged in a mold).

Preferably, and regardless of whether the shape of the ends of the pin is curved or not, this pin according to the invention has a cross section which is substantially polygonal and, even more preferably, substantially square.

A connection device according to the invention comprises:
 a male tubular end-piece which has a convergent and rounded connection end and a connection collar which together define a substantially cylindrical end portion of this end-piece,
 a female tubular end-piece having an end connection portion which receives the male end-piece in a sealed manner by the interposition of at least one annular seal radially around the male end-piece,
 a connection ring which is mounted radially on this connection portion by extending it axially into a front tubular portion of the ring having two apertures which are in the form of an arc of a circle and which are symmetrical with respect to each other relative to the axis of symmetry of the ring and which are each delimited axially by a front edge and a rear edge, and
 a locking member for locking the male end-piece in the female end-piece comprising two resilient locking flaps which are joined together by a gripping head and which are pushed in transversely in a reversible manner through said apertures and which are capable of being blocked by means of snap-fitting in a locked position against and behind the collar following complete insertion of the male end-piece into the female end-piece, and this device is characterized in that the locking member is as defined above, so that:
 at the beginning of the insertion of the male end-piece inside the ring, the connection end of the male end-piece presses on said at least one inclined guiding portion of each flap which has previously been pushed in through the ring, spreading the two flaps from each other in order to guide them over the end portion of the male end-piece until the locked position of the flaps behind and against the collar is obtained, then,
 in this locked position, said at least one inclined blocking portion of each flap blocks the flaps in a closed position axially against said front edges of said apertures, thereby opposing the untimely opening of the flaps during operation.

As explained above, it should be noted that the inclined guiding and blocking portion(s) according to the invention completely comply(ies) with the requirements for ease of fitting and assured locking (that is, preventing any untimely opening of the pin during operation) for such a connection device.

According to another feature of this device of the invention, said respective inner faces of the flaps are spread from each other in the locked position by a distance which is less than the outer diameter of the collar and of the front edges of the apertures.

Advantageously, this locking member may have a composite structure which comprises:
 a metal locking pin which has a rounded or polygonal cross section said which comprises an upper portion which forms the gripping head and two substantially curved branches, and
 two plastics locking sheaths which are fixedly joined to these branches, respectively, for example, by means of clip-fitting or over-molding and which move into contact with the male end-piece and with said front edges of the apertures of the ring during the complete insertion of the male end-piece.

According to another feature of the invention, said at least one annular seal may be interposed radially between the male end-piece and the female end-piece and axially short of the end thereof and of said rear edges of the apertures, the male end-piece preferably having:
 said end portion which acts as a support surface for this seal, and
 a substantially cylindrical clamping portion which is located behind the collar, which collar diverges from the end portion in a substantially frustoconical manner then terminates in a radial annular portion behind which the flaps abut in the locked position, the clamping portion having a diameter less than that of the end portion.

The locking method according to the invention for locking a connection device as set out above substantially comprises:
 a) radially inserting the locking member in a pushed-in position through the ring with which said connection portion of said female end-piece is provided by means of manual pressure applied to said gripping head of this member so that the flaps thereof are accommodated in said apertures,
 b) progressively axially inserting the male end-piece inside the ring equipped in this manner so that the connection end of the male end-piece presses on said at least one inclined guiding portion of each flap, spreading the flaps from each other in order to guide them over the end portion of the male end-piece, then
 c) completely pushing in the male end-piece until said locked position is obtained, in which position the flaps are engaged behind and against said collar and in which position said at least one inclined blocking portion blocks these flaps in an axially closed position against said front edges of the apertures of the ring in order to oppose the untimely opening of these flaps during operation.

According to another feature of the invention, this method may comprise, before step a), fixedly joining, by means of clip-fitting or over-molding, two plastics locking sheaths to two branches of a metal pin, respectively, so that these sheaths move into contact with the male end-piece and with the front edges of the apertures in steps b) and c).

BRIEF DESCRIPTION OF THE DRAWINGS

Other features, advantages and details of the present invention will be appreciated from a reading of the following description of one embodiment of the invention, given by way of non-limiting illustration, the description being given with reference to the appended drawings, in which.

DETAILED DESCRIPTION

Figure 7:
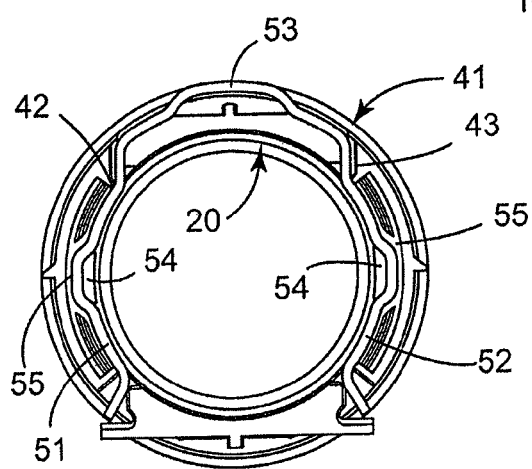
FIG. 7 is a view of this device in radial cross section on the transverse center plane of the locking member, illustrating the composite structure of this member in the state in which it is fully pushed into the connection ring.

A connection device 1 according to the invention (see FIGS. 1 to 4), which can be used in particular in an air intake circuit of a motor vehicle, substantially comprises:

- a male tubular end-piece 10 having a convergent and rounded circumferential connection end 11 and having a connection collar 12 which together define a cylindrical end portion 13,
- a female tubular end-piece 20 which comprises an end connection portion 21 which receives the male end-piece 10 in a sealed manner by the interposition of an annular seal 30 radially around the male end-piece 10,
- a female connection ring 40 which is mounted radially on the connection portion 21 (for example, by means of welding), extending it axially into a front tubular portion 41 of the ring 40 having two apertures 42 and 43 which are in the form of an arc of a circle and which are symmetrical with respect to each other (visible in FIG. 7) relative to the axis of symmetry of the ring 40 and which are each delimited axially by a front edge 42a and a rear edge 42b, and
- a member 50 for locking the male end-piece 10 in the female end-piece 20, which is generally U-shaped and comprises two resilient locking wings or flaps 51 and 52 which are connected to each other by means of a gripping head 53 and which are pushed in transversely in a reversible manner through the apertures 42 and 43, being capable of being blocked by means of snap-fitting in a locked position against and behind the collar 12 following complete insertion of the male end-piece 10 into the female end-piece 20.

Figure 3:
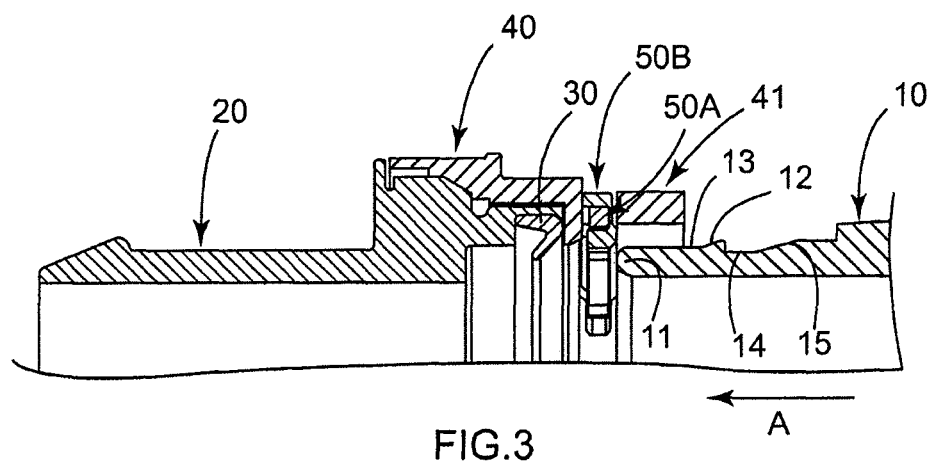
FIG. 3 is a partial view of this device in axial half-section on the plane III-III of FIG. 2, illustrating the co-operation between the male end-piece and the locking member in an initial phase of insertion of the male end-piece into the ring of the female end-piece.

More precisely and as can be seen in FIG. 3, the male end-piece 10 is metal and has, starting from the connection end 11 thereof, the end portion 13 having a diameter D1, a frustoconical ramp 12a of the collar 12 which diverges from the portion 13 in order to reach a diameter D2 and which then terminates in a radial annular portion 12b of the collar 12, a second, cylindrical, clamping portion 14 having a diameter D3 which extends the radial portion 12b at a right angle, and a third, frustoconical, portion 15 which diverges from the second portion 14 in order to reach a diameter D4 (with D3<D1<D2<D4).

Figure 4:
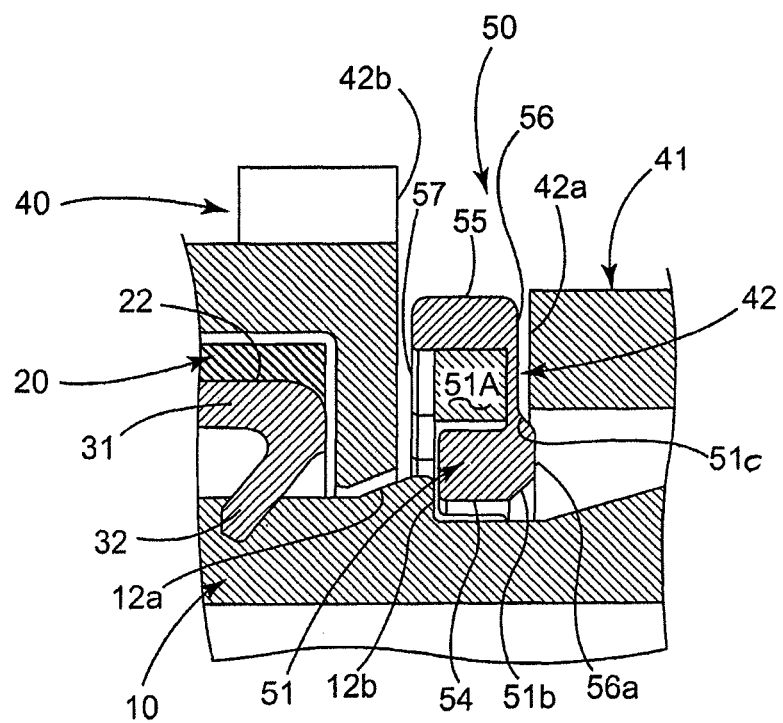
FIG. 4 is a detailed view in axial half-section of the device of FIG. 3, with the locking member in the locked position on the male end-piece, illustrating the co-operation between the member, the ring and this end-piece.
Figure 5:
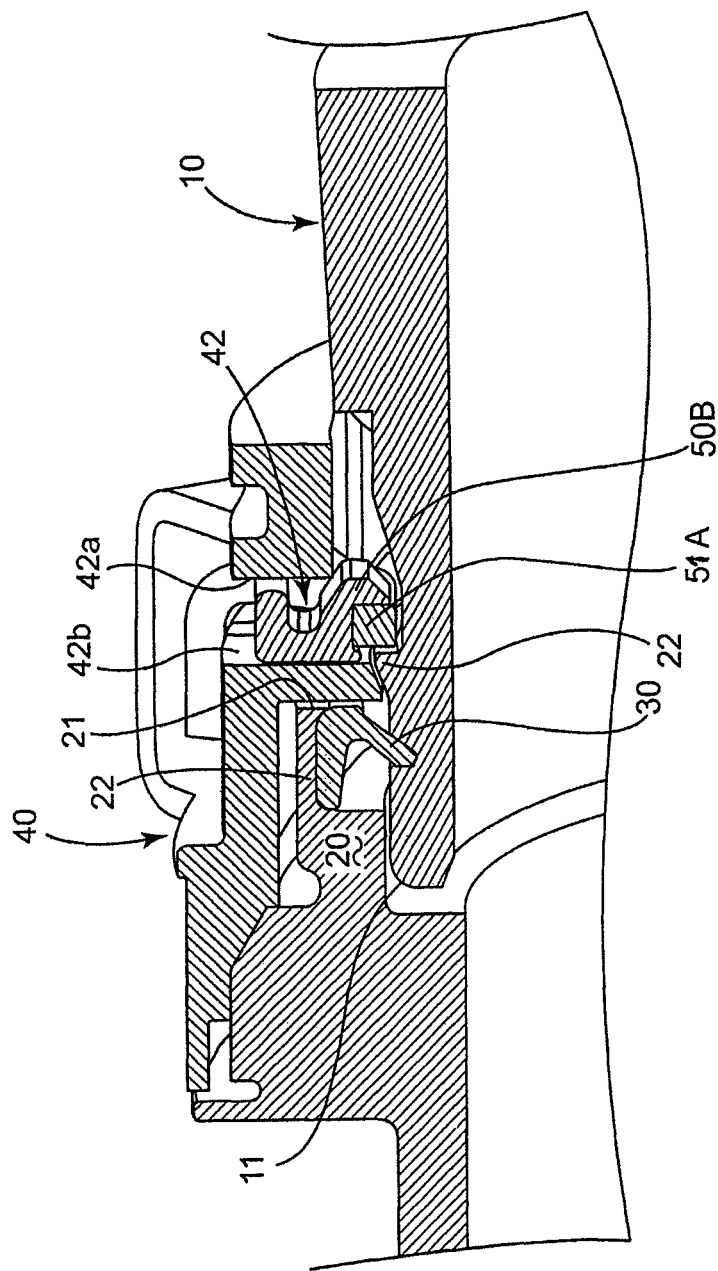
FIG. 5 is a partial view of the same device in axial half-section on the plane V-V of FIG. 2, also illustrating the locking member in the locked position on the male end-piece.

As can be seen in FIGS. 3 and 4, the seal 30 is in this example a lip seal (it being understood that it could be annular or have a non-circular cross section in a variant) which comprises a seal body 31 which is engaged in a circumferential recess 22 of the inner face of the end portion 21 of the female end-piece 20 and a lip 32 which extends obliquely from this seal body 31 in the region of the connection end 23 of the female end-piece 20 in order to press radially against the end portion 13 of the male end-piece 10. The seal 30 may be fitted freely on, or fixedly joined to, the female end-piece 20, for example, by means of over-molding.

Materials which can be used for the female end-piece 20 and the ring 40 include plastics materials such as polyamides (for example, PA-6,6) or polyesters (for example, polybutylene terephthalate), for example.

Materials which can be used for the seal 30 include EPDMs, fluorocarbon elastomers (FKM) or even ethylene methyl acrylate copolymers (EMA), for example.

Figure 2:
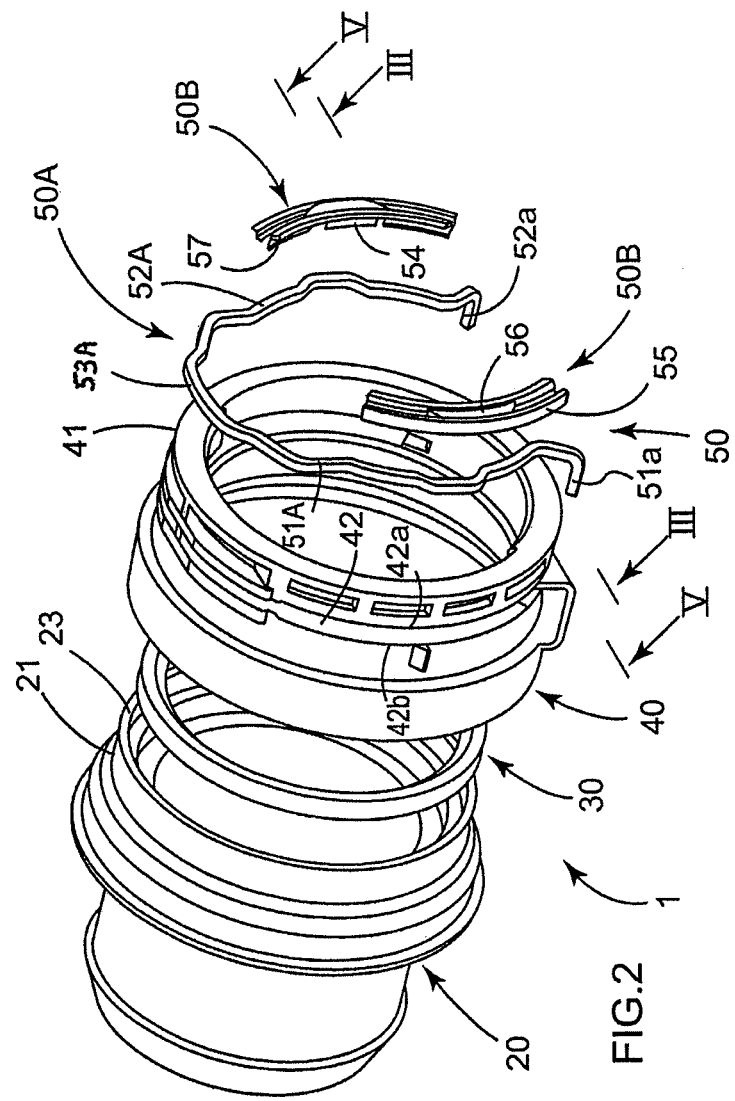
FIG. 2 is an exploded perspective side view of the device of FIG. 1 without the male end-piece, illustrating in particular the composite structure of the locking member.

With regard to the locking member 50, it can be seen in FIGS. 2 to 4 that it has a composite structure comprising:

- a metal locking pin 50A which is formed in this example from a wire having a square cross section comprising an upper portion 53A forming the gripping head 53 and two curved branches 51A and 52A which terminate in two free ends 51a and 52a which are bent over in this example on the same axial side (that is, the rear side) of the remainder of the pin 50A, and
- two identical plastics locking sheaths 50B which are fixedly joined to the branches 51A and 52A, respectively, with the exception of their free ends 51a and 52a and which, according to the invention, each define an inner face 54 and an outer face 55 of each flap 51, 52 which are connected to each other by a front face 56 (the term "front" being understood to be the side from which the end 11 of the male end-piece 10 is introduced). With regard to the rear face 57 of each flap 51, 52, it is in this example defined both by the sheath 50B and by the pin branch 51A, 52A which it surrounds (see FIG. 4).

Each sheath 50B has a generally "U"-shaped cross section which partially surrounds a pin branch 51A, 52A, and it is mounted thereon by clip-fitting or by being fixedly joined thereto by means of over-molding.

Each flap 51, 52 locally comprises inclined portions 51b and 51c which are formed by the corresponding sheath 50B on the front face 56 of the sheath 50B so as to be set back from a foremost portion 56a of this front face 56 and which comprise, formed in extension of each other over the same cross section of each flap 51, 52:

- a guiding chamfer 51b which connects this portion 56a to the inner face 54 of the sheath 50B and which is capable of co-operating with the end 11 of the male end-piece 10 which separates the flaps 51 and 52 from each other in order to guide the insertion of the end-piece 10 until the collar 12 thereof extends axially beyond these flaps 51 and 52, and
- a blocking chamfer 51c which connects this portion 56a to the remainder of the front face 56, extending away from the inner face 54, and which is capable of co-operating with the ring 40, thereby blocking the flaps 51 and 52 in the closed position axially against the front edges 42a of the apertures 42 and 43 in order to act counter to the opening of the member 50 during operation.

Advantageously, the chamfers 51b and 51c of each sheath 50B each form an angle of from 30 to 60° with each inner face 54 and with each foremost portion 56a.

Figure 1:
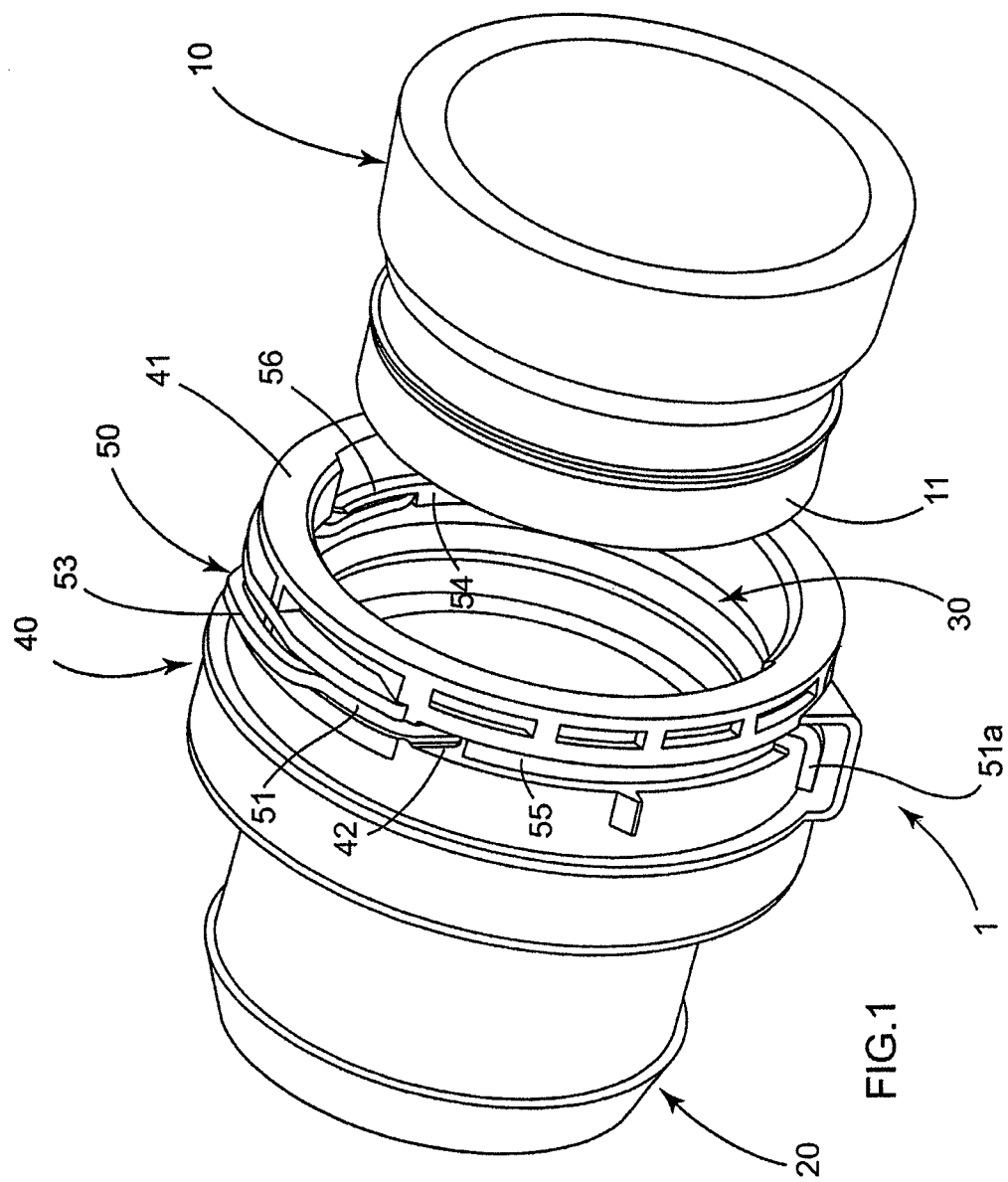
FIG. 1 is a semi-exploded perspective side view of a connection device according to one embodiment of the invention which illustrates a male end-piece to be inserted into a female end-piece which is provided with a connection ring, a seal and a locking member.

As can be seen in FIGS. 3 and 4, the male end-piece 10 is locked in the female end-piece 20 via the connection ring 40 in the following manner:

The locking member 50 is first pushed radially into the ring 40 with which the connection portion 21 of the female end-piece 20 is provided by means of manual pressure applied to the gripping head 53 thereof, which places the flaps 51 and 52 thereof in the apertures 42 and 43 (see the position obtained in FIG. 1).

Then, as illustrated in FIG. 3, the male end-piece 10 is inserted gradually inside the ring 40 in the axial direction (see arrow A) so that the connection end 11 of the male end-piece 10 presses on the guiding chamfer 51b of each sheath 50B, separating the two sheaths 50B from each other in order to guide them over the end portion 13 of the end-piece 10.

Figure 6:
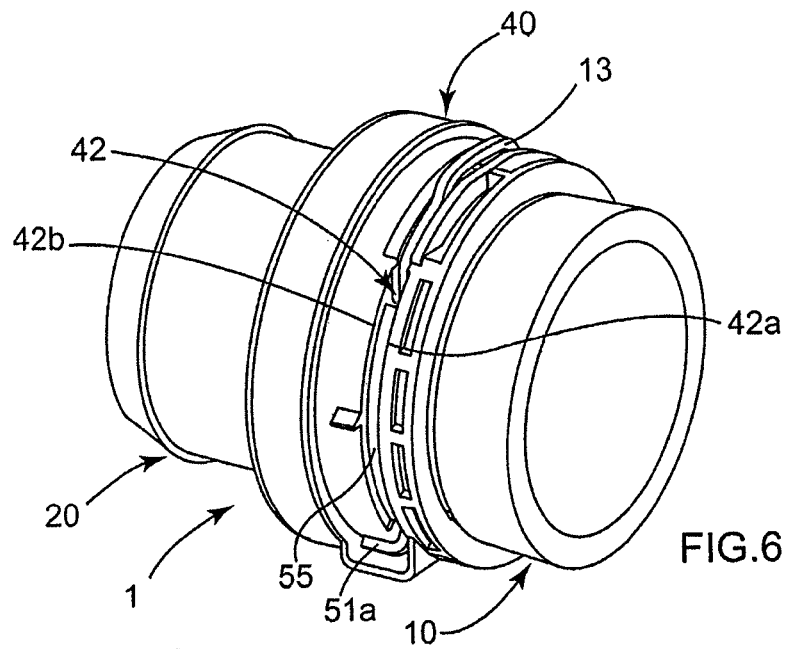
FIG. 6 is an assembled, perspective side view of the same connection device in this locked position of the locking member corresponding to FIGS. 4 and 5.

Finally (see FIG. 4), the male end-piece 10 is completely pushed in until the locked position is obtained, in which position the flaps 51 and 52 are engaged by means of the sheaths 50B thereof behind and against the collar 12 and in which position the blocking chamfers 51c block these flaps 51 and 52 in an axially closed position against the front edges 42a of the apertures 42 and 43 in order to act counter to the untimely opening of the pin 50A during operation. The locked device 1 illustrated in FIG. 6 is thereby obtained.

Figure 8:
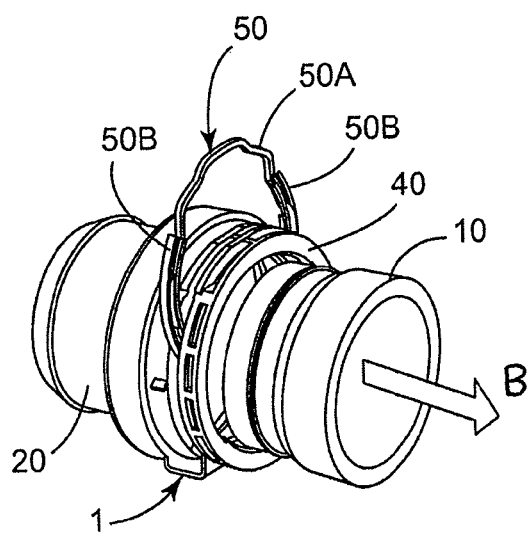
FIG. 8 is a semi-exploded, perspective side view of this connection device illustrating the operations to be carried out in order to unlock and disconnect this device once locked.

In order to disconnect this device 1 (see FIG. 8), the member 50 is first extracted transversely from the ring 40 by being lifted with the gripping head 53 thereof, which has the effect of unlocking the device 1, then axial traction is applied to the male end-piece 10 in the direction of the arrow B of FIG. 8 (that is, in the opposite direction to the direction A of insertion of the end-piece 10 that can be seen in FIG. 3).

The invention claimed is:

1. Locking member configured to be provided on a snap-fitting connection device for fluid transfer comprising:
   a male tubular end-piece having a collar and having a convergent and rounded connection end, and
   a female tubular end-piece which is surrounded and extended axially by a connection ring and which receives the male end-piece in a sealed manner,
   said member comprising-two resilient locking flaps which are joined together by a gripping head and which are capable of being pushed in transversely and in a reversible manner through two respective symmetrical apertures of the connection ring, then of being blocked by means of snap-fitting against and behind said collar following the complete insertion of the male end-piece into the female end-piece, wherein each flap includes a cross section which varies over the length thereof and two inner and outer faces which are connected to each other by two front and rear faces relative to the direction (A) of insertion of the male end-piece, and wherein each flap locally comprises inclined portions which are formed on the front face set back from a foremost portion of this front face and which comprise:
      at least one inclined guiding portion which connects this foremost portion to the inner face and which is capable of co-operating with said end of the male end-piece which spreads the flaps from each other in order to guide the insertion of this end-piece until the collar thereof extends axially beyond these flaps, and
      at least one inclined blocking portion which connects this foremost portion to the remainder of the front face by extending away from the inner face, and which is capable of co-operating with the ring by blocking the flaps in a closed position axially against front edges of the apertures in order to oppose the opening of the member during operation.

2. Locking member according to claim 1, wherein said at least one inclined guiding portion and said at least one inclined blocking portion are each defined, over a same cross section of each flap, by a chamfer which forms an angle of from 30 to 60° with said foremost portion of said front face and/or with said inner face.

3. Locking member according to claim 1, wherein the locking member has a composite structure which comprises:
   a metal locking pin which comprises an upper portion which forms the gripping head and two substantially curved branches which have two free ends, respectively, which are bent over on a same axial side of a remainder of the said locking pin, and
   two plastic locking sheaths which are fixedly joined to these branches, respectively, with the exception of the free ends of said branches, said locking sheaths each alone defining said inner face, said outer face and said front face of each flap including said inclined portions.

4. Locking member according to claim 3, wherein each locking sheath, over said cross section of each flap, substantially has a U shape which partially tightly surrounds each branch of said locking pin which said locking pin having a rounded or polygonal cross section, each sheath being mounted on said locking pin clipping or being fixedly joined to said locking pin by means of over-molding by injection-molding of a plastic material.

5. Connection device for fluid transfer comprising:
   a locking member configured to be provided on a snap-fitting connection device for fluid transfer comprising:
      a male tubular end-piece having a collar and having a convergent and rounded connection end, and
      a female tubular end-piece which is surrounded and extended axially by a connection ring and which receives the male end-piece in a sealed manner,
      said member comprising-two resilient locking flaps which are joined together by a gripping head and which are capable of being pushed in transversely and in a reversible manner through two respective symmetrical apertures of the connection ring, then of being blocked by means of snap-fitting against and behind said collar following the complete insertion of the male end-piece into the female end-piece, wherein each flap includes a cross section which varies over the length thereof and two inner and outer faces which are connected to each other by two front and rear faces relative to the direction (A) of insertion of the male end-piece, and wherein each flap locally comprises inclined portions which are formed on the front face set back from a foremost portion of this front face and which comprise:
         at least one inclined guiding portion which connects this foremost portion to the inner face and which is ca able of co-operating with said end of the male end iece which spreads the flaps from each other in order to guide the insertion of this end-piece until the collar thereof extends axially beyond these flaps, and
         at least one inclined blocking portion which connects this foremost portion to the remainder of the front face by extending away from the inner face, and which is capable of co-operating with the ring by blocking the flaps in a closed position axially against front edges of the apertures in order to oppose the opening of the member during operation, and wherein
   said male tubular end-piece which has said convergent and rounded connection end and said collar which together define a substantially cylindrical end portion of this end-piece,
   said female tubular end-piece which comprises an end connection portion which receives the male end-piece in a sealed manner by the interposition of at least one annular seal radially around the male end-piece, and
   said connection ring which is mounted radially on said end connection portion by extending said end connection portion axially into a front tubular portion of the connection ring having two said apertures, which are in the form of an arc of a circle and which are symmetrical with respect to each other relative to an axis of symmetry of the connection ring and which are each delimited axially by one of said front edges and by a rear edge, said locking member locking the male end-piece in the female end-piece and comprising two of said resilient locking flaps which are joined together by said gripping head and which are pushed in transversely in a reversible manner through said apertures by being capable of being blocked by snap-fitting in a locked position against and behind the collar following complete insertion of the male end-piece into the female end-piece so that:
- at the beginning of the insertion of the male end-piece inside the connection ring, the connection end of the male end-piece presses on said at least one inclined guiding portion of each flap which has previously been pushed in through the connection ring, spreading the two flaps from each other in order to guide them over the end portion of the male end-piece until said locked position of the flaps behind and against the collar is obtained, then,
- in said locked position, said at least one inclined blocking portion of each flap blocks the flaps in said closed position axially against said front edges of said apertures, thereby opposing the untimely opening of the flaps during operation.

6. Connection device according to claim 5, wherein said respective inner faces of the flaps are spread from each other in the locked position by a distance which is less than an outer diameter of the collar and of said front edges of the apertures.

7. Connection device according to claim 5, wherein the locking member has a composite structure which comprises:
- a metal locking pin which has a rounded or polygonal cross section and which comprises an upper portion which forms said gripping head and two substantially curved branches, and
- two plastic locking sheaths which are fixedly joined to these branches, respectively, for example, by means of clip-fitting or over-molding and which move into contact with the male end-piece and said front edges of the apertures of the connection ring during the complete insertion of the male end-piece.

8. Connection device according to claim 5, wherein said at least one annular seal is interposed radially between the male end-piece and the female end-piece and axially short of the end of the female end-piece and of said rear edges of the apertures, the male end-piece having:
- said end portion which acts as a support surface for this seal, and
- a substantially cylindrical clamping portion which is located behind the collar, which collar diverges from the end portion in a substantially frustoconical manner then terminates in a radial annular portion behind which the flaps abut in the locked position, this clamping portion having a diameter less than that of the end portion.

9. Locking method for a connection device according to claim 5, wherein the method substantially comprises the following steps:
a) radially inserting the locking member into a pushed-in position through the connection ring with which said connection portion of the female end-piece is provided, by means of manual pressure applied to said gripping head of this member so that the flaps are accommodated in the apertures,
b) progressively axially inserting the male end-piece inside the connection ring equipped in this manner so that the connection end of the male end-piece presses on said at least one inclined guiding portion of each flap, thereby spreading the flaps from each other in order to guide them over the end portion of the male end-piece, then
c) completely pushing the male end-piece in until said locked position is obtained, in which position the flaps are engaged behind and against the collar and in which position said at least one inclined blocking portion blocks these flaps in an axially closed position against said front edges of the apertures of the connection ring in order to oppose the untimely opening of these flaps during operation.

10. Locking method according to claim 9, wherein the method comprises, before step a), fixedly joining, by clipping or over-molding, two plastic locking sheaths to two branches of a metal pin, respectively, so that the sheaths move into contact with the male end-piece and with said front edges of the apertures in steps b) and c).

* * * * *

UNITED STATES PATENT AND TRADEMARK OFFICE
CERTIFICATE OF CORRECTION

PATENT NO. : 9,004,543 B2
APPLICATION NO. : 13/691110
DATED : April 14, 2015
INVENTOR(S) : Bongiorni et al.

Page 1 of 1

It is certified that error appears in the above-identified patent and that said Letters Patent is hereby corrected as shown below:

In the claims

Column 7,
Line 65, Claim 3, "of the said locking pin" should read --of said locking pin--.

Column 8,
Line 9, Claim 4, "locking pin clipping" should read --locking pin by clipping--;
Line 58, Claim 5, "by the interposition" should read --by interposition--.

Signed and Sealed this
Twentieth Day of October, 2015

Michelle K. Lee
*Director of the United States Patent and Trademark Office*